United States Patent [19]

Bruns et al.

[11] 3,915,462

[45] Oct. 28, 1975

[54] SEALS FOR SEALING A PRESSURE VESSEL SUCH AS A NUCLEAR REACTOR VESSEL OR THE LIKE

[75] Inventors: Hans-Joachim Bruns, Mulheim-Saarn; Karl-Heinz Hülsermann, Oberhausen, both of Germany

[73] Assignee: Deutsche Babcock & Wilcox Aktiengesellschaft, Oberhausen, Germany

[22] Filed: Sept. 6, 1974

[21] Appl. No.: 503,855

[30] Foreign Application Priority Data
Sept. 14, 1973 Germany............................ 2346332

[52] U.S. Cl................. 277/190; 277/123; 277/181
[51] Int. Cl.²............................................ F16J 15/08
[58] Field of Search............ 277/190, 191, 180, 102, 277/123, 124, 125, 235, 206.1

[56] References Cited
UNITED STATES PATENTS

| | | | |
|---|---|---|---|
| 743,666 | 11/1903 | Shaffer................................. | 277/191 |
| 2,284,340 | 5/1942 | Nuckles............................... | 277/124 |
| 2,586,871 | 2/1952 | Shields................................ | 277/180 |
| 3,098,660 | 7/1963 | Hausner............................ | 277/206.1 |
| 3,207,523 | 9/1965 | Johnson............................... | 277/190 |
| 3,217,922 | 11/1965 | Glasgow.............................. | 277/235 |
| 3,690,682 | 9/1972 | Ferrill.................................. | 277/102 |
| 3,833,227 | 9/1974 | Nilsson................................ | 277/190 |

FOREIGN PATENTS OR APPLICATIONS

| | | | |
|---|---|---|---|
| 986,992 | 3/1965 | United Kingdom................. | 277/125 |

*Primary Examiner*—Robert I. Smith
*Attorney, Agent, or Firm*—Roland T. Bryan

[57] ABSTRACT

Seals for sealing a pressure vessel such as a nuclear reactor vessel, steam boiler vessel, or any other vessel which is desirably sealed against pressure of the type including a housing and a housing closure that present opposed vertical sealing surfaces which define the sides of a channel.

The seals of the present invention comprise at least one sealing member disposed in the channel, having at least one stop face, a base portion and two shank portions extending from the base portion to form a groove-like recess. The shank portions are provided with sealing surfaces arranged to mate with the opposed vertical pressure vessel sealing surfaces. A shank-spreading wedge element also disposed in the channel has at least one stop face and is engaged in the groove-like recess with the sealing member and wedge element stop face adjacent each other. The wedge element is formed to force the shank portions and hence the shank portion sealing surfaces horizontally apart to sealingly mate with the opposed vertical pressure vessel sealing surfaces. The wedge element and sealing members are formed so that wedge element penetration into the groove-like recess is restrained when the opposing stop faces make contact with each other prior to plastic deformation of the sealing element but after tight sealing engagement of the respective sealing surfaces. That is, deformation of the sealing members by the wedge element may only occur within the elastic range of the sealing element.

Means for urging the wedge element to penetrate into the sealing member groove-like recess are also provided.

10 Claims, 6 Drawing Figures

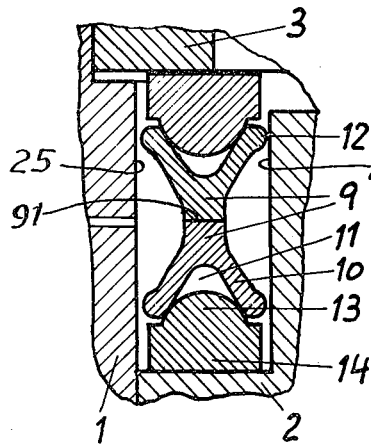
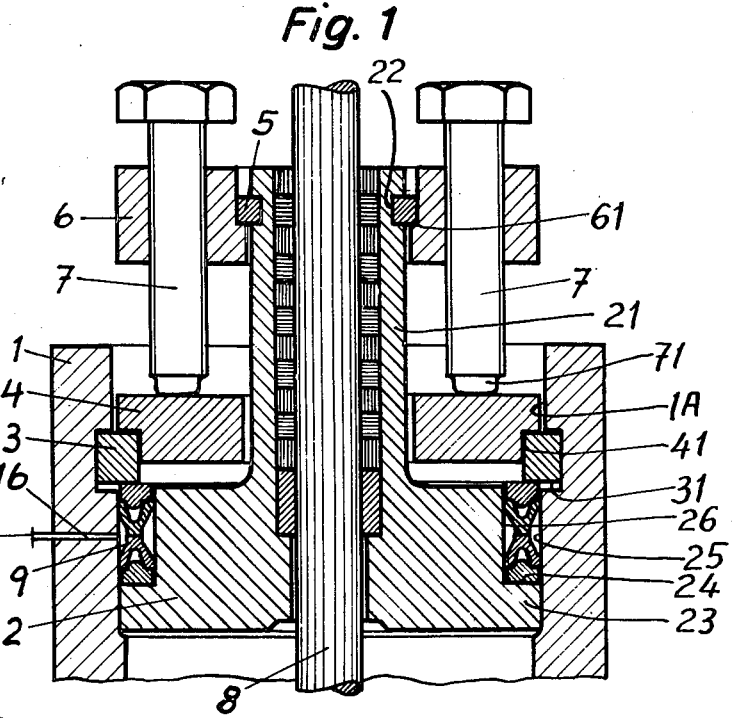
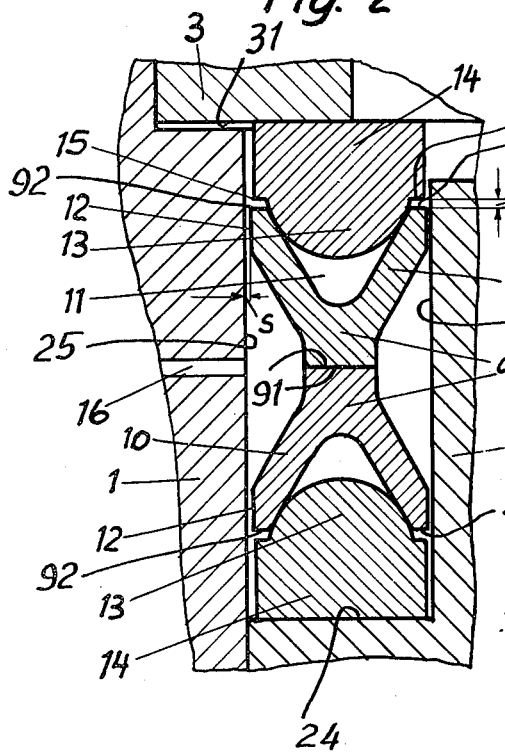
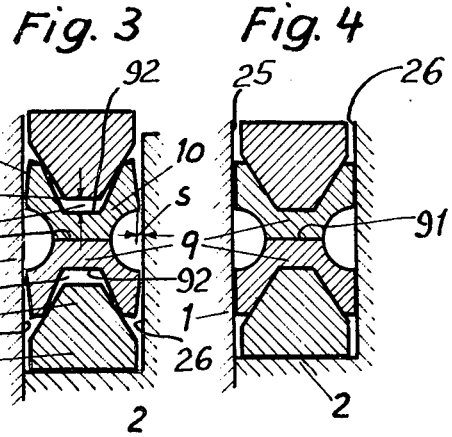
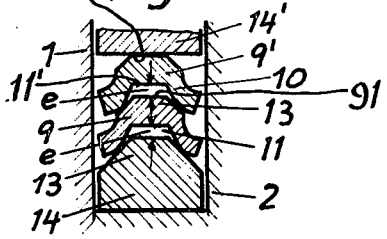

SEALS FOR SEALING A PRESSURE VESSEL SUCH AS A NUCLEAR REACTOR VESSEL OR THE LIKE

BACKGROUND OF THE INVENTION

1. Field of the Invention

The present invention relates to seals for sealing a pressure vessel such as a nuclear reactor vessel, steam boiler vessel, or any other vessel which is to be sealed against pressure.

Pressure vessels in which the seals of the present invention may advantageously be used typically include a cylindrical housing and a housing closure or top and are designed to withstand great stress resulting from large pressures generated in their interiors. Accordingly, the seal formed between the housing and housing closure should be capable of withstanding equivalent stress and pressures.

This form of pressure vessel is typically used in nuclear reactor installations to enclose the nuclear reactor. The vessel functions to confine radioactive contamination in the event of reactor malfunction. Consequently, it is important that the seal between the vessel housing and housing closure function reliably also to confine radioactive contamination in the event of such a malfunction.

A pressure vessel of this type provided with a seal constructed in accordance with the present invention may also be used in steam boiler installations or in any other installation subject to internal or external pressures.

2. Description of the Prior Art

Devices for sealing a pressure vessel housing and housing closure against pressure are presently known. German Patent No. 1,090,039 discloses a system wherein the vessel housing and housing closure are respectively provided with a flange and counterflange, the counterflange having a cylindrical groove disposed on its face. A sealing checkring, which is divided into two portions by a deep conical groove, is inserted into the counterflange groove with slight play. A rib, mounted in the counterflange groove, engages the checkring groove. When the flange bolts are tightened, driving the flange and counterflange together, the rib presses the two checkring portions apart so that the side surfaces of these portions are sealingly pressed against the opposite surfaces of the counterflange groove.

Sealing checkrings of this type are usually fabricated from aluminum and are plastically deformed when the flange and counterflange are pressed together forcing the checkring portions apart. Therefore, such sealing devices cannot be used effectively more than once.

Other seals presently known for sealing such pressure vessels fabricated from compressible materials are not entirely satisfactory under conditions of great stress since high pressures tend to decrease their sealing ability.

Accordingly, seals for sealing pressure vessels of the general types discussed above have disadvantages.

SUMMARY OF THE INVENTION

In the preferred embodiments, described below in detail, the seals of the present invention are designed for sealing a pressure vessel such as a nuclear reactor vessel, steam boiler vessel, or any other vessel which is desirably sealed against pressure that includes a housing and a housing closure. This housing has a first vertical sealing surface and the housing closure has a second opposed vertical sealing surface. Boundary walls extend perpendicularly between and are mounted at the margins of the first and second sealing surfaces, and means are provided for urging these boundary walls together. The first and second sealing surfaces the boundary walls define a channel. The seals comprise at least one sealing member having at least one stop face, a base portion, and two shank portions extending from the base portion to form a groove-like recess and having sealing surfaces arranged to mate with the first and second sealing surfaces. The sealing member is disposed in the channel with the shank portion sealing surfaces adjacent the first and second sealing surfaces. A shank-spreading wedge element, adapted to be positioned in the channel in contact with at least one boundary wall and engaged in the groove-like recess, is provided to force the shank portions horizontally apart to sealingly mate the shank portion sealing surfaces with the first and second sealing surfaces.

The sealing member and the wedge element are both provided with opposing stop faces. When the wedge element is pressed into the sealing member, the stop faces contact each other to prevent further horizontal spreading of the shank portions. The dimensions of the sealing member, the wedge element, the channel, and the distance between these opposed stop faces, when the sealing member and wedge element are in an unstressed condition, are chosen so that an effective seal is formed when the opposed stop faces abut each other. However, these dimensions are also chosen so that only elastic deformation of the sealing member occurs when the opposed stop faces are in abutting relation. That is, the dimensions are chosen so that plastic deformation of the sealing member does not occur when the wedge element is pressed completely into the sealing member.

Over tightening of the seals constructed in accordance with the preferred embodiments of the present invention is prevented by the opposing stop face arrangement. Since the dimensions of the sealing member and the wedge element are chosen to insure that the sealing member deformation remains in the elastic range, the sealing member returns to its original configuration when load is removed. This characteristic facilitates removal of the sealing member from the channel and enables it to be used repeatedly. Further, since the sealing member and wedge element of the preferred embodiments of the present invention are made of metal, problems associated with the use of compressible or plastically deformable material are not present. In particular, repeated loading and unloading of the seals of the present invention does not cause them to lose their sealing capability.

Seals constructed in accordance to the preferred embodiments of the present invention may also be used as selfsealing seals. The operating pressure of the medium which is sealed in the pressure vessel does not effect their sealing capability. Accordingly, they may be used for both high and low operating pressure applications. In addition, these seals may be used for simple lid-type closures. The wedge element may have a semi-circular or trapezoidal cross section or may have any other cross section which provides a shape narrower at an apex than at the base portion. The wedge element stop face may be located at the base or at the apex of this cross section. If this stop face is located at the wedge element apex, lines of force in the seal pass through the center of the sealing member.

The sealing member sealing surfaces may have a toroidal form or circular cross section so that a line of contact in the shape of a circle results between them and the first and second sealing surfaces when the sealing member is locked in place. If desired, however, the sealing member may be designed so that a cylindrical contact between the respective sealing surfaces results.

In one preferred embodiment of the present invention, the sealing member has a cross section in the form of the letter "Y" having a base and two shank or arm portions which extend from this base to form the groove-shaped recess. The sealing member sealing surfaces are disposed on the shank portions. The base of the sealing member is narrower than the horizontal distance between these sealing surfaces. This configuration facilitates elastic deformation of the sealing member when it is fabricated from an alloy such as stainless steel.

Accordingly, it is an object of the present invention to provide unique and novel seals for sealing a pressure vessel such as a steam boiler vessel, nuclear reactor vessel, or any other vessel which is desirably sealed against pressure.

Other objects, aspects and advantages of the present invention will be pointed out in, or will become understood from the following detailed description, when considered in conjunction with the accompanying drawings.

BRIEF DESCRIPTION OF THE DRAWINGS

FIG. 1 is a partial vertical cross-sectional view of a seal constructed in accordance with a preferred embodiment of the present invention shown mounted in a pressure vessel having a housing and a housing closure.

FIG. 2 is an enlarged left-side partial vertical cross-sectional view of this seal having two sealing members and two wedge elements shown in the unstressed condition.

FIG. 3 is a left-side partial vertical cross-sectional view, similar to that shown in FIG. 2 illustrating a second embodiment of the present invention. The sealing members are shown in their unstressed condition.

FIG. 4 is a cross-sectional view of the embodiment shown in FIG. 3 illustrating this seal in the stressed condition.

FIG. 5 is another left-side partial vertical cross-sectional view, similar to that shown in FIG. 2 illustrating a third embodiment of the present invention.

FIG. 6 is yet another left-side partial vertical cross-sectional view, similar to that shown in FIG. 2 of a fourth embodiment of the present invention.

DESCRIPTION OF THE PREFERRED EMBODIMENTS

FIG. 1 illustrates the upper part of a pressure vessel equipped with a seal which embodies the present invention. This pressure vessel includes a cylindrical housing 1 which is fitted with a cylindrical housing closure or cap piece 2. The cylindrical housing and housing closure may be of shapes other than those illustrated if desired. Additionally, the housing closure illustrated in FIG. 1 carries a valve stem 8 which may be used to activate a valve (not shown). However, the housing closure may be a solid cap without provision for a valve stem or any other communication with the interior of the pressure vessel.

The cylindrical housing is provided with an annular groove 1A into which is fitted a split ring 3 that protrudes into the interior of the housing. The lower surface of the split ring forms an upper boundary wall 31. A hold down or secondary lid 4 is provided with a downwardly facing annular rabbet 41 which engages the portion of the split ring 3 which projects into the housing interior.

The housing closure 2 is illustrated with an upwardly extending shaft 21 in which a packing sealed value stem 8 is carried. The exterior of this shaft 21 is provided with an annular groove 22 which carries a second split ring 5. A stop collar 6 is mounted over the housing closure shaft 21 and is formed with an upwardly facing annular rabbet 61 which butts against the portion of the second split ring 5 that extends away from the closure shaft 21. Four machine screws 7 are threaded into the stop collar 6 and are provided with dog points 71 that engage the secondary lid 4. When the machine screws 7 are tightened, the secondary lid 4 and the stop collar 6 are driven apart. This action in turn drives the first split ring 3 downward. As shown in FIG. 1, the annular groove 1A in the cylindrical housing has a height greater than that of the split ring 3 and thus permits this downward movement.

The housing closure is formed with an outwardly directed flange 23 on its lower margin which forms an upwardly facing lower boundary wall 24. The housing has a first sealing surface 25 in the region of the housing closure 2 and this closure 2 has a second sealing surface 26 opposed to the first 25. Thus an annular channel is defined by the opposing sealing surfaces 25 and 26 and the upper and lower boundary walls 31 and 24.

FIG. 2 illustrates in detail the seal contructed in accordance with the present invention shown in FIG. 1. This seal comprises two similar ring sealing elements 9 which are positioned in the channel formed by the assembly of housing 1 and housing closure 2. Both sealing elements 9, shown in FIG. 2 in their unstressed or undeformed condition, have a Y-shaped cross section formed by a base portion 91 and two shanks or arms 10 which extend outwardly from this base portion. These shanks 10 define an annular groove-shaped recess 11. Vertical sealing surfaces 12 are disposed on the outwardly facing sides of these shanks 10 opposite the first and second sealing surfaces 25 and 26. Further, the base 91 of the sealing element 9 is narrower than the horizontal distance between these sealing member sealing surfaces 12.

As illustrated in FIGS. 1 and 2, two ring seal elements 9 are positioned in the channel formed in the cylindrical housing and housing closure with their bases 91 in firm contact with each other. Although two ring seal elements 9 are illustrated, one is sufficient to form an adequate seal. However, when two sealing elements 9 are employed as illustrated in FIG. 2, the space formed between corresponding shanks 10 of the opposite sealing elements 9, and the first and second vertical sealing surfaces 25 and 26 may be used as a leak exhaust chamber. A bore or conduit 16 may be provided in the wall of the cylindrical housing 1 for this purpose and may be connected to an exhaust pipe 17 as shown in FIG. 1 for providing communication with the exhaust chamber.

Upper and lower annular shank spreading wedge elements 13 are provided to engage each groove-shaped recess 11 formed by the respective shank portions 10 of each sealing member 9. Each wedge element 13 may be integrally formed with a pressure ring 14. The pressure ring of the upper wedge element abuts the upper boundary wall 31 on the first split ring 3 and the pressure ring of the lower wedge element abuts the lower boundary wall 24 on flange 23 formed on the lower margin of the housing closure 2. The wedge elements 13 function to force the shank portions 10 of each sealing member 9 apart when driven into the respective groove-like recess 11 under the influence of force developed by the screws 7 driving the stop collar 6 and the secondary lid 4 and hence the split ring 3 apart. By driving the shank portions 10 apart the vertical sealing surfaces 12 are pressed into sealing engagement with the vertical sealing surface 25, i.e. the wall of the cylindrical housing 1 and the vertical sealing surface 26, i.e. the wall of the housing closure 2. In this fashion, a tight seal is formed between the cylindrical housing and housing closure sealing surfaces 25 and 26 and the sealing member sealing surfaces 12.

The wedge element 13, illustrated in FIG. 2, is semicircular in cross-section. Each side of the semi-circular cross section is provided with a stop face 15 at the juncture of the wedge element 13 and pressure ring 14 which is arranged to abut an opposing stop face 92 on the extreme of each shank portion 10 of the sealing elements 9. The opposing stop faces prevent the wedge element 13 from excessive penetration into the groove-shaped recess 11, and thus, prevent excessive spreading of the shank portions 10. The distance $e$ between the respective stop faces 15 and 92 and the distance $s$ between opposed sealing surfaces 12 and 25 or 26 when this seal is in unstressed or undeformed condition are chosen so that a tight seal is formed by horizontal spreading of the shank portions 10 prior to plastic deformation of the sealing elements 9. That is, the distances $s$ and $e$ become zero within the elastic limit of the material from which the sealing element is fabricated. By providing opposed stop faces 15 and 92 on the wedge element 13 and the sealing elements 9, the secondary lid 4 may be completely tightened without fear of plastically deforming the sealing elements 9.

The provision of stop faces 92 and 15 on the opposing elements, namely the sealing member 9 and the wedge element 13, which limit deformation of the sealing element to that within the elastic range of the material from which it is fabricated, provides several advantages. Since the sealing element is prevented from being plastically deformed, it returns to its original configuration when stress or load is removed. Accordingly, the sealing elements may easily be removed from the channel formed by the cylindrical housing 1 and opposing closure 2 when the house closure is removed. Furthermore, the sealing elements may be used repeatedly, that is, they may be stressed and subsequently unstressed many times. Thus, material savings are achieved. Since the sealing elements are made from an incompressible material, such as stainless steel or other metal, the tendency of seals made from compressible material to lose their sealing efficiency is avoided. Finally, the dimensions of the sealing members and wedge elements and consequently the dimensions $e$ and $s$, may be chosen so that a highly efficient seal is formed by the seal of the present invention while still achieving the advantages discussed above.

FIGS. 3 and 4 illustrate a second embodiment of the present invention in which reference numerals, similar to those used with respect to FIGS. 1 and 2, are utilized to identify similar structural elements and characteristic features. FIG. 3 illustrates a seal constructed in accordance with this second embodiment in its unstressed condition. The sealing element sealing surfaces 12 form a slight angle with the sealing surface 25, i.e. the wall of the cylindrical housing 1 and the sealing surface 26, i.e. the wall of the housing closure 2 in this unstressed condition. Further, the annular wedge elements 13 have a trapezoidal cross section of the wedge element 13. Accordingly, the opposing stop face 92 of the ring sealing element 9 is disposed at the vertex of the angle formed by the shank portions 10. The dimension $e$ is the distance between these opposed stop faces 15 and 92 when the seal is in its unstressed condition.

FIG. 4 illustrates this second embodiment of the present invention in the stressed condition. As shown, the deformation of the sealing elements 9 causes the sealing element sealing surfaces 12 to form tight vertical seals with the corresponding sealing surfaces 25 and 26 formed on the cylindrical housing 1 and housing closure 2. This tight seal results when the respective annular wedge elements 13 are driven into the groove-like recesses 11 formed in each sealing element by the collective action of the machine screws 7, the stop collar 6, the secondary lid 4, the first and second slip-rings 3 and 5 and the housing closure shaft 21. Again, the dimensions of the wedge elements 13, the sealing members 9, and in particular dimensions $e$ and $s$ are chosen so that a tight seal results when the dimensions $e$ and $s$ become zero prior to plastic deformation of the sealing elements.

This second embodiment of the present invention provides an advantage in addition to those discussed in relation to the first embodiment in that the lines of force which stress the seal pass through the center of the sealing elements 9. This characteristic aids in the distribution of the sealing force.

A third embodiment of the present invention in which upper and lower sealing members 9' and 9 are employed is illustrated in FIG. 5. However, in this embodiment, only one wedge element 13 formed with a pressure ring 14 is utilized. This single wedge element 13 projects upwardly into the groove-like recess of the lower sealing member 9. The upper and lower sealing ring elements 9' and 9 are similar in shape and nested, that is, oriented with the base 91 of the lower sealing element engaging the groove-like recess 11' of the upper sealing element so that when the wedge element 13 spreads the shanks or arms of the lower ring seal member 9, that seal performs the function of the wedge element in relation to the upper ring seal member 9'. The upper pressure ring 14' has a planar surface which abuts the base 91' of this upper sealing member. If desired, more than two sealing members may be used in putting this third embodiment of the present invention into practice.

Again, when the upper and lower pressure rings are driven together, the dimension $e$ becomes zero, causing the shank portion sealing surfaces 12 of each sealing element 9 and 9' to make contact with the corresponding sealing surfaces 25 and 26 formed on the cylindrical housing 1 and the housing closure 2, that is, the dimension $s$ also becomes zero. The dimensions of the various components of this seal are chosen so this tight seal results prior to plastic deformation of the sealing elements.

FIG. 6 illustrates a fourth embodiment of the present invention similar to that shown in FIGS. 1 and 2. However, the sealing surfaces 12 of the sealing members 9 of this embodiment are curved in cross section. Thus, the entire sealing surface forms a torus. This fourth embodiment differs from the first embodiment which has a planar sealing surface 12 disposed on the extreme of each shank portion 10 of the sealing members 9. Thus, contact between the sealing element sealing surfaces 12 and the sealing surfaces 25 and 26 of the pressure vessel is in the form of a line.

Although specific embodiments of the present invention have been disclosed in detail above, it is to be understood that this is for purposes of illustration. This disclosure of seals for sealing pressure vessels such as nuclear reactor vessels, steam boiler vessels, or any other vessel which is desirably sealed against pressure, should not be construed as limiting the scope of the invention, since modifications may be made to the described structures by those skilled in the art in order to adapt these seals to particular sealing applications.

We claim:

1. A seal for sealing a pressure vessel such as a nuclear reactor vessel, steam boiler vessel, or any other vessel desirably sealed against pressure, the pressure vessel including a housing having a first sealing surface; a housing closure having a second opposed sealing surface; two opposing boundary walls extending perpendicularly between and mounted respectively at the margins of the first and second sealing surfaces, the boundary walls and first and second sealing surfaces defining a channel; and means for urging the opposing boundary walls together; said seal comprising:

elastically deformable sealing member means formed of incompressible metal including at least one stop face, a base portion, and at least two shank portions extending from said base portion to form a groove-like recess, each shank portion having a sealing surface arranged to mate with one of the first or second sealing surfaces, said sealing member means being disposed in the channel with said shank portions adjacent the first and second sealing surfaces; and shank-spreading wedge means, having at least one stop face, disposed in the channel butting against at least one of the pressure vessel boundary walls and engaged in the sealing member means groove-like recess with said sealing member and wedge means stop faces adjacent each other, said wedge means being formed to elastically deform said sealing member means by forcing said shank portions and, hence, said shank portion sealing surfaces apart to make sealing contact with the first and second sealing surfaces when the opposing boundary walls are urged together driving said wedge means into the groove-like recess, the positioning of and distance apart of said stop faces being that which allows the wedge means to only spread the shank porion within the elastic limit of the material of said seal when said stop faces are in firm contact with each other.

2. The seal for sealing a pressure vessel such as a nuclear reactor vessel, steam boiler vessel or any other vessel desirably sealed against pressure, as claimed in claim 1 wherein said sealing member means stop face is located at the vertex of the groove-like recess and said opposing wedge means stop face is located at the apex of said wedge means.

3. The seal for sealing a pressure vessel such as a nuclear reactor vessel, steam boiler vessel, or any other vessel, which is desirably sealed against pressure as claimed in claim 1 wherein said wedge means is integrally formed with pressure ring means and said sealing member means has two stop faces each located at an extreme of one of said shank portions and said opposing wedge means has two stop faces located at the juncture of said wedge means and said pressure ring means.

4. The seal for sealing a pressure vessel such as a nuclear reactor vessel, steam boiler vessel, or any other vessel which is desirably sealed against pressure as claimed in claim 1 wherein said shank portion sealing surfaces have a curved cross sectional shape.

5. The seal for sealing a pressure vessel such as a nuclear reactor vessel, steam boiler vessel, or any other vessel which is desirably sealed against pressure as claimed in claim 1 wherein said shank portion sealing surfaces have a linear cross sectional shape.

6. The seal for sealing a pressure vessel such as a nuclear reactor vessel, steam boiler vessel, or any other vessel which is desirably sealed against pressure as claimed in claim 1 wherein each shank portion sealing surface forms an acute angle with the first or second sealing surface prior to deformation of said sealing means.

7. The seal for sealing a pressure vessel such as a nuclear reactor vessel, steam boiler vessel, or any other vessel which is desirably sealed against pressure as claimed in claim 1 wherein said shank portion sealing surfaces are separated by a distance greater than the extent of said sealing member means base.

8. The seal for sealing a pressure vessel such as a nuclear reactor vessel, steam boiler vessel, or any other vessel which is desirably sealed against pressure as claimed in claim 1 wherein said sealing member means comprises:

two sealing members each having at least one stop face, a base portion and two shank portions extending from said base portion to form a groove-like recess and wherein said two sealing members are arranged with their respective base portions in mutual abutting contact.

9. The seal for sealing a pressure vessel such as a nuclear reactor vessel, steam boiler vessel, or any other vessel which is desirably sealed against pressure as claimed in claim 1 wherein said sealing member means comprises:

a plurality of at least two nested sealing members each having at least one stop face, a base portion and two shank portions extending from said base portion to form a groove-like recess and wherein said shank-spreading wedge means engages the groove-like recess of a first of said plurality of sealing members, the base portion of said first of said plurality of sealing members is adapted to engage the groove-like recess of a second of said plurality of sealing members and functions as does the wedge means, and the base portion of any subsequent sealing member being adapted to engage the groovelike recess of any following sealing member.

10. A seal for sealing a pressure vessel such as a nuclear reactor vessel, steam boiler vessel, or any other vessel desirably sealed against pressure, said vessel presenting opposed sealing surfaces, said seal comprising:
elastically deformable sealing member means formed of incompressible metal including at least one stop face; a base portion; and at least two shank portions extending from said base portion to form a groove-like recess, each shank portion having a sealing surface arranged to mate with one of the opposed pressure vessel sealing surfaces;
shank-spreading wedge means, having at least one stop face, engaged in the sealing member means groove-like recess with said sealing member and wedge means stop faces adjacent each other,
said wedge means being formed to elastically deform said sealing member means by forcing said shank portions and, hence, said shank portion sealing surfaces apart to make sealing contact with the opposed pressure vessel sealing surfaces when urged to penetrate into the groove-like recess, the positioning of and distance apart of said stop faces being that which allows the wedge means to only spread the shank portion within the elastic limit of the material of said seal when said stop faces are in firm contact with each other, and
means for urging said wedge means to penetrate into said groove-like recess.

* * * * *